United States Patent Office 3,242,144
Patented Mar. 22, 1966

3,242,144
PRODUCT
James G. McNally, Jr., Media, Pa., assignor to E. I. du Pont de Nemours and Company, Wilmington, Del., a corporation of Delaware
No Drawing. Filed June 6, 1962, Ser. No. 200,311
7 Claims. (Cl. 260—78.4)

This invention relates to the preparation of vinyl addition type polymers, to such polymers and to compositions containing them.

In one of the areas of utility of organic polymers, i.e. clear and pigmented coating compositions, there has been a continuing search for a class of organic film-forming component which provides the fast drying of nitrocellulose lacquers and the high initial gloss and the cure or insolubility of enamels such as alkyd resin-based enamels, along with other required properties of acceptable coating compositions. These properties include ease of application, durability, compatibility with other coating ingredients and resistance to the deleterious effect of elements encountered during service in protecting and decorating a wide variety of articles.

It is the main objective of this invention to provide such a class of organic film-forming material.

In general the process of this invention involves modifying a preformed vinyl addition type polymer having readily replaceable pendent or extralinear substituents with replacement groups terminating in 1,3-cyclic acetal radicals having in the 2-position an alpha-methylenically unsaturated substituent.

More particularly, the process involves preparing an addition polymer containing extralinear 1,3-cyclic acetal radicals by (1) transesterifying (a) a preformed addition polymer having extralinear $C_2$–$C_5$ carbalkoxy groups attached to different carbon atoms, which carbon atoms have at least one hydrogen substituent with (b) at least one member of the class consisting of (i) hydroxy-1,3-cyclic acetals having in the 2-position an alpha-methylenically unsaturated substituent and (ii) saturated $C_2$–$C_4$ aliphatic monocarboxylic acid esters thereof, and (2) during transesterification removing a by-product more volatile than the polymeric product and the reactants.

The preformed addition polymer should preferably have the usual features of a polymer for coating purposes in terms of solubility in common organic solvents and flowability either alone or in solution.

Vinyl addition polymers for coating purposes are typically prepared from such monomers as styrene, alpha-methyl styrene, vinyl toluene, $C_1$–$C_{18}$ alkyl acrylates, methacrylates and itaconates, $C_1$–$C_4$ alkyl maleates and fumarates, acrylic and methacrylic acids and their amides, alkylolamides and nitriles, vinyl chloride and vinyl acetate. For the particular purposes of this invention, the preformed addition polymers contain at least one polymerized monomer which provides, spaced along the polymer chain, pendent radicals which can be replaced via chemical reaction by the required 1,3-cyclic acetal radicals. In order to provide sites that are readily transesterifiable, the preformed addition polymer should preferably contain a methyl, ethyl, propyl or butyl ester of an acid polymerized in the polymer chain, the ester being such that its pendent —COO alkyl moiety (i.e. a $C_2$–$C_5$ carbalkoxy group) is attached to a carbon atom having a hydrogen substituent. Examples are the methyl to butyl esters of acrylic and itaconic acids. If the preformed polymer is by desire or necessity a homopolymer, it should preferably be derived from the last mentioned class of ester.

Especially preferred preformed polymers are (a) homopolymers of saturated $C_1$–$C_4$ alkyl esters of acrylic acid and (b) interpolymers of (i) at least one member of the class consisting of styrene and saturated $C_1$–$C_{18}$ alkyl esters of acrylic, methacrylic and itaconic acids and (ii) at least one different substance of the class consisting of saturated $C_1$–$C_4$ alkyl esters of acrylic and itaconic acids. Polymers derived from one, two or three monomers are preferred for simplicity, but four or more monomers can be used where an additional monomer used provides a desirable or necessary property.

Examples of preferred preformed interpolymers are those containing polymerized monomers in about the following weight proportions:

| | Percent |
|---|---|
| Methyl methacrylate | 30–80 |
| Ethyl acrylate | 70–20 |
| | |
| Styrene | 30–60 |
| Ethyl acrylate | 70–40 |
| | |
| Methyl methacrylate | 30–70 |
| Octyl, decyl or stearyl methacrylate | 5–30 |
| Ethyl acrylate | 25–60 |
| | |
| Dimethyl itaconate | 20–50 |
| Methyl methacrylate | 10–60 |
| Ethyl acrylate | 20–40 |
| | |
| Butyl methacrylate | 60–70 |
| Dimethyl itaconate | 40–30 |
| | |
| Ethyl acrylate | 30–70 |
| Dimethyl itaconate | 70–30 |

The preformed addition polymers preferably have a molecular weight in the range of about 3000–50,000 as measured by the osmotic pressure method. Such molecular weights tend to provide solubility in common organic solvents and to yield readily flowable solutions containing at least 15–20% of polymer. While lower polymer concentrations than these (which still higher molecular weights tend to yield) are useful for some purposes, they usually yield coating compositions of such low solids content that an unreasonable number of separate coats is needed to build up the normally required 1–3 mils of dry coating.

In order to attach pendent or extralinear cyclic acetal radicals by the preferred method to the preformed polymer, the latter is transesterified with a hydroxy-1,3-cyclic acetal or an acetate, propionate or butyrate ester thereof. For example, a preformed polymer comprising polymerized ethyl acrylate has a plurality of pendent or extra linear —$COOC_2H_5$ groups, and transesterification of such a polymer in accordance with this invention replaces some or all of these ethyl (—$C_2H_5$) radicals with cyclic acetal radicals. If the cyclic acetal compound used is, for instance, 4 - (omega hydroxybutyl) - 2 - vinyl-1,3-dioxolane, ethyl radicals of the preformed polymer are replaced with (2-vinyl-1,3-dioxolan-4-yl) butyl radicals as by-product ethyl alcohol is removed from the reaction mixture.

The cyclic acetal compounds which can be used in this invention contain in the 2-position an alpha-methylenically unsaturated substituent. Examples of such 2-position substituents are vinyl, alpha methyl vinyl (isopropenyl), and other alpha substituted vinyl groups in which the alpha substituent is, for instance, alkyl, alkenyl, aryl, acyloxy, alkoxy, aryloxy, carbalkoxy, chloro, fluoro, bromo, cyano, chloroalkyl, fluoroalkyl and cyanoalkyl.

Vinyl and isopropenyl are preferred. Vinyl is especially preferred for the preparation of fast drying polymers.

Although the acetal ring of the cyclic acetal compound can be a dioxolane, dioxane, dioxepane, dioxocane, dioxonane or the like, dioxolanes and dioxanes are preferred because of the easier availability of corresponding 1,2 and 1,3-dihydroxy precursors (e.g. glycerine, 1,2,5-pentanetriol, 1,2,6-hexanetriol, trimethylol ethane, trimethylol propane).

The following are preferred 1,3,-cyclic acetal compounds for use in this invention:

4-(omega hydroxybutyl)-2-vinyl-1,3-dioxolane
4-(omega hydroxpropyl)-2-vinyl-1,3-dioxolane
4-hydroxymethyl-2-vinyl-1,3-dioxolane
5-hydroxy-2-vinyl-1,3-dioxane
5-hydroxymethyl-5-methyl-2-vinyl-1,3-dioxane
5-hydroxymethyl-5-ethyl-2-vinyl-1,3-dioxane and the 2-isopropenyl homologs of these compounds, and the acetate esters of such compounds.

The term transesterification and related terms as used in the description of this invention relates to reactions between an ester and an alcohol to form a new ester and a new alcohol and to reactions between two esters to form two new esters. The chemical art sometimes uses for the same reactions the terms ester interchange, ester exchange or ester disproportionation.

The transesterification process of this invention is carried out with care mainly because (1) the unsaturated 2-substituent of the cyclic acetal moiety is polymerizable and usually it is desirable not to induce polymerization until the resulting transesterified polymer is put to use and (2) the ring of the cyclic acetal moiety is susceptible to opening which destroys desired pendent cyclic acetal moieties and in turn tends to cause other undesirable side reactions.

For these and other reasons the reaction is preferably carried out at moderate temperatures, in the presence of a transesterification catalyst, in the presence of a volatile solvent, under an inert atmosphere, and in the substantial absence of acidic materials.

Representative reaction temperatures are room temperature to about 205° C. At room temperature, the reaction usually proceeds too slowly to be commercially feasible. At temperatures much above 205° C., ring opening, polymerization, decomposition and undesirable side reactions tend to occur. Preferred temperatures are about 100°–150° C.

The presence of a transesterification catalyst in normal proportions tends to speed the reaction and to minimize side reactions. Representative catalysts are lower alkyl orthotitanates such as tetraisopropyl titanate, and metal alcoholates such as sodium, potassium, lithium or aluminum methoxide to butoxide. These are preferred. Others include the classes of transesterification catalysts represented by litharge and dibutyl tin oxide.

Carrying out the transesterification in a volatile solvent for the reaction mixture and the product fluidizes the reaction mixture for easy agitation and provides a distilling aid or potential binary-former for the volatile by-product. Suitable solvents include esters, ketones and hydrocarbons of the character commonly used in paints, lacquers and the like. Aromatic hydrocarbon solvents are preferred, such as toluene, xylene or benzene.

An inert atmosphere over the reaction mixture is preferred to minimize exposure of the reaction mixture and the product to free oxygen. An inert atmosphere can be provided by such measures as maintaining a flow of an inert gas like nitrogen in the system or using an inert solvent in the reaction mixture and operating under reflux conditions.

A polymerization inhibitor can be incorporated in the transesterification reaction to suppress polymerization and the accompanying increase in viscosity or ultimate gelation. Representative inhibitors are hydroquinone, phenothiazine and p-phenylenediamine.

The amount of cyclic acetal compound used in the reaction mixture is a function of the amount of cyclic acetal moiety desired to be chemically attached to the performed polymer and the degree of completeness desired in the reaction. Since minor proportions of unreacted cyclic acetal compound can be tolerated in the final product, it has been found convenient to carry the transesterification to a conversion of 75–90% instead of prolonging the reaction and resorting to rigorous conditions necessary to achieve a high conversion of 95% or 100%. A molar excess of 10–25% of cyclic acetal compound over theoretical is a convenient and preferred proportion. Of course the theoretical amount is one molar equivalent of cyclic acetal compound per mol of transesterifiable ester desired to be converted in the preformed polymer.

The preferred amount of cyclic acetal moiety, e.g. (2-vinyl-1,3-dioxolan-4-yl) butyl radical, in the final transesterified polymer is about 15–70% by weight of the final polymer, which amount corresponds to about 10–120 cyclic acetal radicals per average polymer molecule. A further preferred range is 25%–45%.

In becoming attached to the polymer molecule the cyclic acetal radical tends to replace the lowest molecular weight radical representing the alcohol moiety of the transesterifiable ester or esters in the preformed polymer. For example in a preformed copolymer of styrene and ethyl acrylate, the latter is the transesterifiable substance. Ethyl radicals would be replaced by e.g. (2-vinyl-1,3-dioxolan-4-yl) butyl radicals, and ethyl alcohol would be the distillable by-product if said substituted butyl radical is introduced as 4-hydroxybutyl-2-vinyl-1,3-dioxolane. Ethyl acetate would be the by-product if said substituted butyl radical is introduced as 4-acetoxybutyl-2-vinyl-1,3-dioxolane.

Further by way of illustration, if the preformed polymer is a copolymer of ethyl acrylate and dimethyl itaconate, both said esters are transesterifiable in accordance with this invention. In this case, the reaction would favor replacement of the methyl radicals of the itaconate ester over the ethyl radicals of the acrylate ester.

In each case, the by-product lower alkyl alcohol or ester is distilled off as the reaction proceeds, preferably in admixture (e.g. as a binary) with volatile solvent from the reaction mixture. Volatile solvent thus lost from the reaction mixture can be replenished if desired.

In the preferred preparative procedures described herein, the new polymers of this invention do not require purification for their principal utility as organic film-forming materials in liquid coating compositions. However, extraction, distillation, solvent removal, washing or other known purifying techniques for soluble polymers can be applied if desired.

The above described polymers are useful primarily as film-forming materials in organic coating compositions. Coatings based on these polymers and applied in the general manner of paints, varnishes, enamels or lacquers, e.g. by spraying, dipping, brushing, roller coating or the like, have the property of air-drying, that is converting or curing by an oxygen-induced reaction to a condition in which the dried coating is no longer soluble in the solvent of the liquid coating composition. This air-drying can occur at normal painting temperatures of about 50° F. and above. The drying time can be shortened by force-drying or baking at moderately elevated temperatures such as 120°–200° F.

The new polymers of this invention can be the sole organic film-forming component of such coating compositions, or they can be blended with other compatible film-formers such as vinyl resins, acrylic resins, vegetable oils, oil modified alkyd resins, cellulose esters and ethers, cellulose nitrate, epoxy resins, aminoaldehyde resins and the like.

Other common ingredients of organic coating compositions can be included in the manner and proportions well known in the coating art. These include solvents and diluents, plasticizers, catalysts, hardeners, surface active agents and the like. Particularly included in this class of additives are the metallic driers of the paint art, i.e. soaps and salts of the siccative metals. Cobalt is a preferred drier metal. The proportion of drier is usually within the range of 0.0005%–3% of metal (in the drier) based on the weight of air-drying film-forming material present.

Suitable solvents and diluents include aliphatic and aromatic hydrocarbons, esters, ketones and alcohols, and mixtures thereof.

Conventional pigments and extenders such as metal oxides, hydroxides, chromates, silicates, sulfides, sulfates, carbonate, organic dyes and lakes thereof and metal-flake pigments can be used, if desired, in the coating compositions of this invention in conventional amounts.

The following examples illustrate the principles and practice of this invention. It is to be understood that, since only a few representative embodiments are shown, other embodiments which yield analogous results can be easily prepared by substituting for a component in a specific example an equivalent proportion of a corresponding component disclosed hereinbefore, with appropriate adjustments if necessary in the operating conditions.

Unless otherwise indicated in the following examples, parts are given by weight, ingredients are high quality commercial grades, and relative viscosities are reported on 0.5% solutions in xylene, measured at 25° C.

EXAMPLE 1

Preparation of preformed polymer

A preformed polymer 50:50 methyl methacrylate:ethyl acrylate for ultimate transesterification is prepared by charging 4120 parts by weight of xylene into a reaction vessel equipped with a dropping funnel, thermometer, agitator and reflux condenser with distillation head. This is heated to 140° C. (head temp. 133° C.) and dropwise addition of the following mixture is begun:

| | Parts by wt. |
|---|---|
| Methyl methacrylate | 1690 |
| Ethyl acrylate | 1690 |
| Ditertiarylbutyl peroxide | 101 |

Addition is completed in about 4.5 hours, while the charge is held at reflux temperature (head 115°–125° C.). Reflux is maintained for an additional 15 hours. Then during a period of about 2 hours the temperature is gradually raised (to head 135° C.) while 264 parts of distillate are collected. The charge is then cooled.

The resulting preformed polymer solution contains about 47.7% solids. The polymer has a relatively viscosity of about 1.0410. Its molecular weight (osmotic pressure method) is about 11,000.

Preparation of transesterified polymer

A polymer of this invention is prepared by transesterifying the preformed polymer (prepared directly above) as follows: 1010 parts of the preformed polymer solution containing 480 parts of polymer (2.40 mols of transesterifiable ethyl acrylate) is charged to a reaction vessel equipped with a thermometer, agitator and condenser, along with 360 parts of xylene and 268 parts of 4-hydroxybutyl-2-vinyl-1,3-dioxolane (1.55 mols, which is 0.65 equivalent based on the ethyl acrylate). This charge is brought to distillation temperature (145° C. pot temp., 138° C. head temp.) and 45 parts of distillate are taken off. Then 8.4 parts of a catalyst solution (10% lithium methoxide in methanol) are added. Distillation is begun again, and the head temperature is gradually raised from about 75° C. following catalyst addition to about 137° C. in about 6 hours. During this period, an additional 8.4 parts of catalyst solution and a further 4.2 parts of catalyst solution are added at 1.5 hours and 4.5 hours respectively. During the 6 hour distillation period a total of about 65 parts of ethanol (attributable to the transesterification) are distilled off along with xylene and methanol (from the catalyst solution).

The resulting solution of transesterified polymer of this invention contains 45.6% solids. The polymer constituent contains 36.7% by weight of cyclic acetal moiety, i.e. (2-vinyl-1,3-dioxolan-4-yl) butyl radical. Thus the polymer contains about 30 cyclic acetal radicals per average polymer molecule.

EXAMPLE 2

Preparation of preformed polymer

Using the apparatus and general procedure described in the corresponding section of Example 1 a preformed polymer is prepared from the following ingredients:

| | Parts by wt. |
|---|---|
| Aromatic hydrocarbon solvent ("Solvesso" 100) | 1200 |
| Methyl methacrylate [1] | 400 |
| Ethyl acrylate [1] | 400 |
| Ditetrtiarybutyl peroxide catalyst | 24 |

[1] Commercial grade treated to remove inhibitor by washing and distilling.

Addition of monomer/catalyst mixture begins at solvent reflux temperature of 155° C. Addition takes 5.5 hours. Reflux temperature of the full charge is about 90° C. Reflux is continued for additional 17 hours. Final distillation takes the head temperature to 157° C. and 90 parts of distillate are collected.

The resulting preformed polymer solution contains about 43.5% solids. The polymer has a molecular weight of about 5500.

Preparation of transesterified polymer

Using the apparatus and general procedure described in the corresponding section of Example 1, a transesterified polymer of this invention is prepared from the following ingredients:

| | Parts by wt. |
|---|---|
| Aromatic hydrocarbon solvent ("Solvesso" 100) | 280 |
| Preformed polymer solution of this example | 920 |
| 4-hydroxybutyl-2-vinyl-1,3-dioxolane | 172 |
| Lithium methoxide solution, 10% in methanol; catalyst | 21 |

The distillation preceding the first addition of catalyst produces 39 parts of distillate, using a head temperature of 158° C. Distillation in the presence of catalyst requires three hours at head temperatures ranging from 77° C. to 139° C. 47 parts of ethanol are distilled off along with solvent and methanol.

The resulting transesterified polymer solution is concentrated by vacuum distillation which removes an additional 640 parts of solvent.

The resulting solution of transesterified polymer contains 80.3% solids. The polymer constituent contains 32% by weight of (2-vinyl-1,3-dioxolan-4-yl) butyl radical. This corresponds to about 13 cyclic acetal radicals per average polymer molecule.

EXAMPLE 3

Preparation of preformed polymer

The following charge is placed in a sealable polymerization vessel:

| | Parts by wt. |
|---|---|
| Toluene | 1042 |
| Methyl methacrylate | 360 |
| Ethyl acrylate | 240 |
| Benzoyl peroxide | 30 |

The air in the vessel is substantially replaced by nitrogen and the vessel is sealed. The vessel is agitated and kept at about 85° C. for 17 hours. The preformed polymer solution thus produced contains 41.3% solids, and the polymer has a relative viscosity of 1.0721 and a molecular weight of about 44,000.

*Preparation of transesterified polymer*

Using the apparatus and general procedure described in the corresponding section of Example 1, a transesterified polymer of this invention is prepared from the following ingredients:

| | Parts by wt. |
|---|---|
| Preformed polymer solution of this example | 1476 |
| Toluene | 867 |
| 4-hydroxybutyl-2-vinyl-1,3-dioxolane | 357 |
| Tetraisopropyl titanate | 24 |
| Toluene (second portion) | 346 |

Distillation preceding the first addition of catalyst produces 15 parts of distillate, using a head temperature of 105° C. The first portion (10 parts) of catalyst is added and the head temperature is maintained at 75°–80° C. Following 2 hours and 19 hours of reaction, 4 and 10 parts respectively of further catalyst are added. At 40 hours, the 346 additional parts of toluene are added to counteract the earlier thickening of the charge. After a total of 65 hours, the reaction is finished. During this period a total of 67 parts of ethyl alcohol is distilled off along with toluene. The batch is concentrated to 46.66% solids by vacuum distillation.

The polymer constituent of the resulting transesterified polymer of this invention contains 29% by weight of (2-vinyl-1,3-dioxolan-4-yl) butyl radicals. Thus the polymer contains about 107 cyclic acetal radicals per average polymer molecule.

EXAMPLE 4

The general procedure for preparing the preformed polymer of Example 1 is repeated using the following ingredients:

| | Parts by wt. |
|---|---|
| Xylene | 5400 |
| Methyl methacrylate | 1158 |
| Ethyl acrylate | 1158 |
| Ditertiarybutyl peroxide | 69 |

Addition of monomer/catalyst mixture takes 5 hours and refluxing is continued for 1 hour thereafter. Finally 72 parts of distillate are collected at a head temperature rising to 133° C.

The resulting preformed polymer solution contains about 30.5% solids. The polymer has a relative viscosity of 1.0234 and a molecular weight of about 4000.

A transesterified polymer of this invention is prepared by neutralizing residual acidity in 500 parts of this preformed polymer solution with a trace of potassium hydroxide and then adding 83 parts of 4-hydroxybutyl-2-vinyl-1,3-dioxolane. Following distillation of low boilers at a head temperature of 135° C., 3 parts of tetraisopropyl titanate catalyst are added and the batch is held at a head temperature of 106°–128° C. for 1.5 hours when 2 additional parts of the same catalyst are added and refluxing is continued for 2.5 additional hours. During this period 19 parts of ethyl alcohol are distilled off along with xylene.

The resulting transesterified polymer solution contains 39.1% solids. The polymer constituent contains 35.1% by weight of (2-vinyl-1,3-dioxolan-4-yl) butyl radical. This corresponds to about 10 cyclic acetal radicals per average polymer molecule.

EXAMPLES 5, 6 AND 7

*Preparation of preformed polymers*

Three preformed polymers are prepared by the method in the corresponding section of Example 3 using the following charges:

| | Parts by wt. | | |
|---|---|---|---|
| | Ex. 5 | Ex. 6 | Ex. 7 |
| Toluene | 500 | 500 | 500 |
| Acetone | 250 | 250 | 250 |
| Dimethyl itaconate | 175 | 175 | 175 |
| Butyl methacrylate | 325 | | |
| Methyl methacrylate | | 175 | 225 |
| Decyl methacrylate/octyl methacrylate mixed ester | | 150 | |
| Stearyl methacrylate | | | 100 |
| Benzoyl peroxide | 25 | 25 | 25 |
| Analytical percent solids | 39.94 | 38.87 | 39.32 |
| Relative viscosity | 1.0452 | 1.0443 | 1.0441 |

Each of these is converted to a polymer of this invention by transesterification using the following charge and the apparatus of the corresponding section of Example 1.

| | Parts by weight |
|---|---|
| Preformed polymer solution prepared directly above | 1239 |
| Toluene | 778 |
| 4-hydroxybutyl-2-vinyl-1,3-dioxolane | 179 |
| Dibutyl tin oxide | 13 |
| Tetraisopropyl titanate | 7.6 |

Acetone in the preformed polymer solution is stripped off a mixture of the first two ingredients by raising the head temperature gradually to 105° C. Then the third ingredient and 5 parts of dibutyl tin oxide are added. Refluxing (63°–75° C.) is continued and distillate is collected for 3 hours, 20 minutes when 5 parts more of dibutyl tin oxide are added. Following three more hours or refluxing (75°–85° C.) and distillate collection the 3 final parts of dibutyl tin oxide are added. The tetraisopropyl titanate is added in two portions at 13 hours and 15 hours respectively as the head temperature gradually rises to 90° C. At 20 hours the reaction is complete. During this period, a total of 26–28 parts of methanol (from dimethyl itaconate by transesterification) is collected along with toluene. This represents a replacement of about 80%–82% of the methyl groups of dimethyl itaconate in the prepolymers with cyclic acetal radicals.

The resulting transesterified polymer solutions are concentrated to about 55%–60% solids content by vacuum distillation of solvent.

EXAMPLE 8

Using the transesterification apparatus and general procedure of the foregoing examples, polyethyl acrylate is converted to a polymer of this invention as follows:

| | Parts by weight |
|---|---|
| Polyethyl acrylate (molecular weight about 10,000), 53.5% solution in xylene | 900 |
| Xylene | 1000 |
| 4-hydroxybutyl-2-vinyl-1,3-dioxolane | 830 |
| Lithium methoxide, 10% solution in methanol; catalyst | 25 |

Thirty parts of volatiles including methanol and water are distilled off before a first portion (16 parts) of catalyst solution is added. Following refluxing and slow distillation at a head temperature of 105°–120° C. for 3 hours the remainder (9 parts) of the catalyst solution is added. In 5 more hours of reaction, the head temperature has risen to 135° C., and a total of 197 parts of ethanol has been distilled off along with xylene.

The transesterified polymer thus produced contains 65.5% by weight of (2-vinyl-1,3-dioxolan-4-yl) butyl radicals which corresponds to about 88 cyclic acetal radicals per average polymer molecule.

EXAMPLE 9

A preformed polymer is prepared from the following charge using the apparatus and general procedure described in Example 1:

| | Parts by weight |
|---|---|
| Xylene | 1465 |
| Styrene | 1110 |
| Ethyl acrylate | 910 |
| Ditertiarybutyl peroxide | 44 |

Addition of monomer catalyst mixture begins at a solvent reflux temperature of about 135° C. Addition takes 5.5 hours. Reflux temperature of the full charge is about 95° C. Reflux is continued for an additional 16 hours. Final distillation takes the head temperature to 137° C. and 112 parts of distillate are collected. The resulting preformed polymer solution contains 60.3% solids.

A transesterified polymer of this invention is prepared using the apparatus and general procedure described in Example 1 and the following charge:

| | Parts by weight |
|---|---|
| Xylene | 650 |
| Preformed polymer solution of this example | 572 |
| 4-hydroxybutyl-2-vinyl-1,3-dioxolane | 163 |
| Lithium methoxide solution, 10% in methanol; catalyst | 13.5 |

The distillation preceding the first addition of catalyst produces 22 parts of distillate, using a head temperature of 135° C. Following the addition of a first portion (11 parts) of catalyst, refluxing and slow distillation are continued for 2.5 hours. Then the remaining catalyst (2.5 parts) is added and refluxing with slow distillation is continued for an additional 2.5 hours. During this period a total of 41 parts of ethanol are distilled off.

The resulting transesterified polymer solution contains 35.0% solids. The polymer contains 33.8% (2-vinyl-1,3-dioxolan-4-yl) butyl radicals.

EXAMPLE 10

A preformed polymer is prepared by first charging 24,020 parts of xylene and 11,000 parts of dimethyl itaconate and 7,000 parts of ethyl acrylate into a reaction vessel, then heating the resulting mixture to the reflux temperature, about 125° C. Next, 725 parts of ditertiarybutyl peroxide are added to the reaction mixture, which is then heated at the reflux temperature (125° to 136° C.) for about 3 hours. Low boiling materials and solvent (total 1000 parts) are then vacuum distilled from the reaction mixture which is then cooled to room temperature. The resulting polymer contains 61% of dimethyl itaconate and 39% of ethyl acrylate and has a relative viscosity in a 0.5% solution in xylene at 25° C. of 1.01662.

Next, 7,950 parts of a 60:40 mixture of 4-hydroxymethyl-2-vinyl-1,3-dioxolane and 4-hydroxy-2-vinyl-1,3-dioxane are added to the aforementioned cooled reaction mixture. After this hydroxy-substituted cyclic acetal is added, low-boiling materials including water are stripped from the reaction mixture, then 150 parts of tetraisopropyl titanate catalyst are added thereto. The reaction mixture is next heated for about 2 hours at reflux, 50 additional parts of catalyst are added thereto, then heating is continued for an additional 2½ hours at the reflux temperature, 128 to 138° C. At the end of the transesterification reaction, 76.3% of the methyl radicals of the dimethyl itaconate in the aforementioned copolymer have been replaced with (2-vinyl-1,3-dioxolan-4-yl) butyl radicals.

EXAMPLE 11

300 parts of cumene solvent are brought to reflux, then 65 parts of methyl methacrylate, 35 parts of ethyl acrylate and 5 parts of cumene hydroperoxide are added thereto. The resulting reaction mixture is heated for 17 hours at its reflux temperature, 128 to 153° C., to yield a polymer solution containing 24.47% solids. Next, to this solution are added 200 parts of toluene and 63 parts of 4-hydroxybutyl-2-isopropenyl-1,3-dioxolane, then low-boiling materials are stripped therefrom. After two parts of tetraisopropyl titanate have been added, the reaction mixture is heated at 118° C. for about 10 hours during which time 2 more parts of tetraisopropyl titanate are added. During the reaction about 80% of the ethyl radicals in the ethyl acrylate of the polymer are replaced with (2-isopropenyl-1,3-dioxolan-4-yl) butyl radicals. Finally, the resulting polymer is precipitated from the reaction mixture and is redissolved in toluene.

EXAMPLES 12–15 COATING COMPOSITIONS

*Example 12.*—Coating compositions of this invention are prepared by separately admixing with the transesterified polymer solutions of each of the foregoing examples an amount of cobalt(ous) butyl phthalate solution in toluene to provide 0.05% cobalt based on the transesterified polymer content.

Each composition is converted into a coating by drawing a sample thereof on a primed steel panel under a doctor knife having a 2 mil clearance and allowing the wet coating to dry by exposure to air at room temperature. All of the coatings become tack-free in 4 to 12 hours and hard in less than one day. All are clear, adherent and insoluble in the solvent of the liquid coating composition.

*Example 13.*—A mill base is prepared by grinding 1,180 parts of titanium dioxide pigment with 891 parts of the transesterified polymer solution of Example 10 (containing 472 parts of polymer) until a smooth, uniform dispersion is obtained.

Next, 1635 parts of the same polymer solution are blended with 800 parts of a 25% solution in hydroxyethyl acetate of ½-second cellulose acetate butyrate and 500 parts of an equal weight mixture of methyl ethyl ketone and hydroxyethyl acetate. Then 2,071 parts of the aforementioned mill base are admixed therewith.

Finally, 16.4 parts of a 4% solution of cobalt butyl phthalate in toluene are added to the above mixture which is then diluted to 45% solids with hydroxyethyl acetate and sprayed on the lower part of an automobile body. The resulting wet coating has excellent leveling and flow properties, excellent sag resistance, dries dust-free in about 15 to 25 minutes, and is hard and adherent enough in about 3 to 4 hours to permit being taped to define the boundary of a coating of a contrasting color to be sprayed immediately on the upper part of the body. The coating has high gloss and is free of flooding and pigment flocculation. It has excellent protective properties and remains glossy during service.

The cellulose acetate butyrate can be omitted. However, more care is required in spraying vertical surfaces to prevent sagging or running of the wet coating, the dust free time is increased 2 or 3 fold and the tape time is prolonged 3 or 4 hours.

*Example 14.*—A pale green coating composition is prepared by compounding the transesterified polymer of Example 11 with titanium dioxide pigment, a small proportion of phthalocyanine green pigment solvent and cobalt drier in substantially the proportions and following the general procedure of Example 13. The resulting composition applied as a coating dries dust-free in about 45 minutes to 1 hour and dry-to-tape in 7 to 8 hours. The addition of 15% of ½ second cellulose acetate butyrate, based on the weight of polymer, yields a composition having a dust-free time of about 30 minutes, a tape time of about 4 hours and somewhat improved sag resistance.

*Example 15.*—A pale blue aerosol coating composition, which sprays spontaneously upon being released from a pressurized can equipped with a valve and spray nozzle, is prepared by grinding the pigments of the following formula in the polymer solution as described above and subsequently admixing the remaining ingredients with the ground portion:

| | Parts by wt. |
|---|---|
| Transesterified polymer solution of Example 10 | 227 |
| Polymethyl methacrylate solution [1] | 40 |
| Titanium dioxide pigment | 131 |
| Indanthrone blue lake pigment | 1 |
| Cobalt butyl phthalate solution (4% cobalt content) | 2 |
| Silicone oil (DC-550) | 0.04 |
| Xylene | 17 |
| Hydrocarbon solvent ("Solvesso" 150) | 42 |
| Acetone | 176 |
| Methyl ethyl ketone | 29 |
| Fluorocarbon propellant ("Freon" 12) | 335 |

[1] Polymer relative viscosity 1.165 in ethylene dichloride (see U.S. 2,934,509), 40% solids in 70:30 toluene:acetone.

This product is particularly useful as a "four hour" household enamel for repainting furniture, kitchen cabinets and the like. It dries hard enough to handle with care in 4–6 hours.

EXAMPLE 16

A coating composition having outstanding utility as an automobile refinishing lacquer is prepared on the following formula by the general procedure of the immediately preceding examples:

| | Parts by wt. |
|---|---|
| Transesterified polymer solution of Example 1 | 780 |
| Titanium dioxide pigment | 193 |
| Blue pigment | Trace |
| Violet pigment | Trace |
| Ethyl cellulose (Hercules N-14), 10% solution in toluene | 35 |
| Cobalt butyl phthalate, 4% solution in xylene | 7 |

For spray application, this product is thinned to spraying consistency with the following composition. About 20% by volume is needed.

| | Parts by wt. |
|---|---|
| Benzoyl peroxide | 1.8 |
| Dioxane | 10.2 |
| Hydrocarbon solvent ("Solvesso" 100) | 88.0 |

Coatings dry dust-free in 20–30 minutes at 75° F. and ready-to-tape in 3.5–4.5 hours. If the benzoyl peroxide is omitted, the ready-to-tape time increases to 5–7 hours.

It is apparent that many widely different embodiments of this invention can be made without departing from the spirit and scope thereof. Therefore it is not intended to be limited except as indicated in the appended claims.

I claim:
1. A vinyl addition polymer having extralinear carboxyl ester moieties, said moieties being esterified with 1,3-cyclic acetal moieties having alpha-methylenically unsaturated substituents in their 2-positions, said acetal moieties constituting 15–70% by weight of said polymer, the carboxyl carbon atom of each said ester moiety being attached to a carbon atom in the polymer chain having at least one hydrogen substituent, and carbon and carboxylate oxygen atoms solely constituting the chain connecting said cyclic acetal moieties with the polymer chain.

2. An addition polymer according to claim 1 in which said 1,3-cyclic acetal moieties are derived from 2-vinyl-1,3-dioxolane.

3. An addition homopolymer of one of the saturated $C_1$–$C_4$ alkyl esters of acrylic and itaconic acids, said polymer having extralinear carboxyl ester moieties, said moieties being esterified with 1,3-cyclic acetal moieties having alpha-methylenically unsaturated substituents in their 2-positions, said acetal moieties constituting 15–70% by weight of said homopolymer.

4. An interpolymer of
 (a) at least one member of the class consisting of styrene and saturated $C_1$–$C_{18}$ alkyl esters of acrylic, methacrylic and itaconic acids, and
 (b) at least one different member of the class consisting of saturated $C_1$–$C_4$ alkyl esters of acrylic and itaconic acids,
said interpolymer having extralinear carboxyl ester moieties, said moieties being esterified with 1,3-cyclic acetal moieties having alpha-methylenically unsaturated substituents in their 2-positions, said acetal moieties constituting 15–70% by weight of said interpolymer.

5. An interpolymer of about 50–60% of methyl methacrylate and about 50–40% of ethyl acrylate, said polymer having extralinear carboxyl ester moieties, said moieties being esterified with (2-vinyl-1,3-dioxolane-4-yl)-butyl moieties, said (2-vinyl-1,3-dioxolane-4-yl)-butyl moieties constituting about 25–45% by weight of said interpolymer.

6. An interpolymer of styrene and ethyl acrylate, said polymer having extralinear carboxyl ester moieties, said moieties being esterified with (2-vinyl-1,3-dioxolane-4-yl)-butyl moieties, said (2-vinyl-1,3-dioxolane-4-yl)-butyl moieties constituting about 25–45% by weight of said interpolymer.

7. A liquid coating composition comprising as an essential film-forming material a polymer according to claim 1 and a solvent therefor.

References Cited by the Examiner

UNITED STATES PATENTS

| 2,138,763 | 11/1938 | Graves | 260—86.1 |
| 2,298,039 | 10/1942 | D'Alelio | 260—78.5 |
| 2,680,725 | 6/1954 | Fegley et al. | 260—86.3 |
| 3,010,918 | 11/1961 | Ikeda | 260—78.5 |
| 3,010,923 | 11/1961 | Ikeda | 260—78.5 |

JOSEPH L. SCHOFER, *Primary Examiner.*

DONALD E. CZAJA, *Examiner.*